United States Patent
Brittain et al.

[11] Patent Number: 5,321,877
[45] Date of Patent: Jun. 21, 1994

[54] METHOD AND APPARATUS FOR CUTTING OIL-FILTER CANISTERS

[76] Inventors: Charles Brittain; Gilbert B. Ross, both of 8414 San Fernando Rd., Sun Valley, Calif. 91352

[21] Appl. No.: 109,169

[22] Filed: Aug. 19, 1993

Related U.S. Application Data

[60] Continuation of Ser. No. 967,763, Oct. 28, 1992, Pat. No. 5,245,739, and a continuation-in-part of Ser. No. 997,728, Dec. 30, 1992, Pat. No. 5,297,332, said Ser. No. 967,763, is a division of Ser. No. 851,011, Mar. 13, 1992, Pat. No. 5,182,842, said Ser. No. 997,728, is a continuation-in-part of Ser. No. 851,011, Mar. 13, 1992.

[51] Int. Cl.$^5$ .................. B23P 19/00; B23P 19/04; B67B 7/46
[52] U.S. Cl. .................... 29/426.4; 29/240; 29/DIG. 67; 30/434
[58] Field of Search .............. 29/403.3, 426.2, 426.3, 29/426.4, 801, 822, 240, DIG. 67; 30/417, 430, 434, 441; 82/92, 101; 269/47, 50, 51, 52

[56] References Cited

U.S. PATENT DOCUMENTS

| | | | |
|---|---|---|---|
| 1,472,862 | 11/1923 | Angell | 30/430 |
| 1,842,047 | 1/1932 | Poeppel | 30/417 |
| 2,461,015 | 2/1949 | Withrow | 30/417 |
| 2,510,195 | 6/1950 | Tinsley | 30/430 |
| 3,608,192 | 9/1971 | Hansel | 30/441 |
| 3,900,948 | 8/1975 | Kammeraad | 30/441 |
| 5,205,195 | 4/1993 | Crosslen et al. | 30/441 |
| 5,214,830 | 6/1993 | Rozycki | 29/240 |

*Primary Examiner*—Mark Rosenbaum
*Assistant Examiner*—David P. Bryant
*Attorney, Agent, or Firm*—Louis J. Bachand

[57] ABSTRACT

Ready separation of a severed oil filter canister from its filter element is provided by cutting the canister from its base with a single bevel side cutter which does not cause the canister metal to invade or engage the filter element.

9 Claims, 1 Drawing Sheet

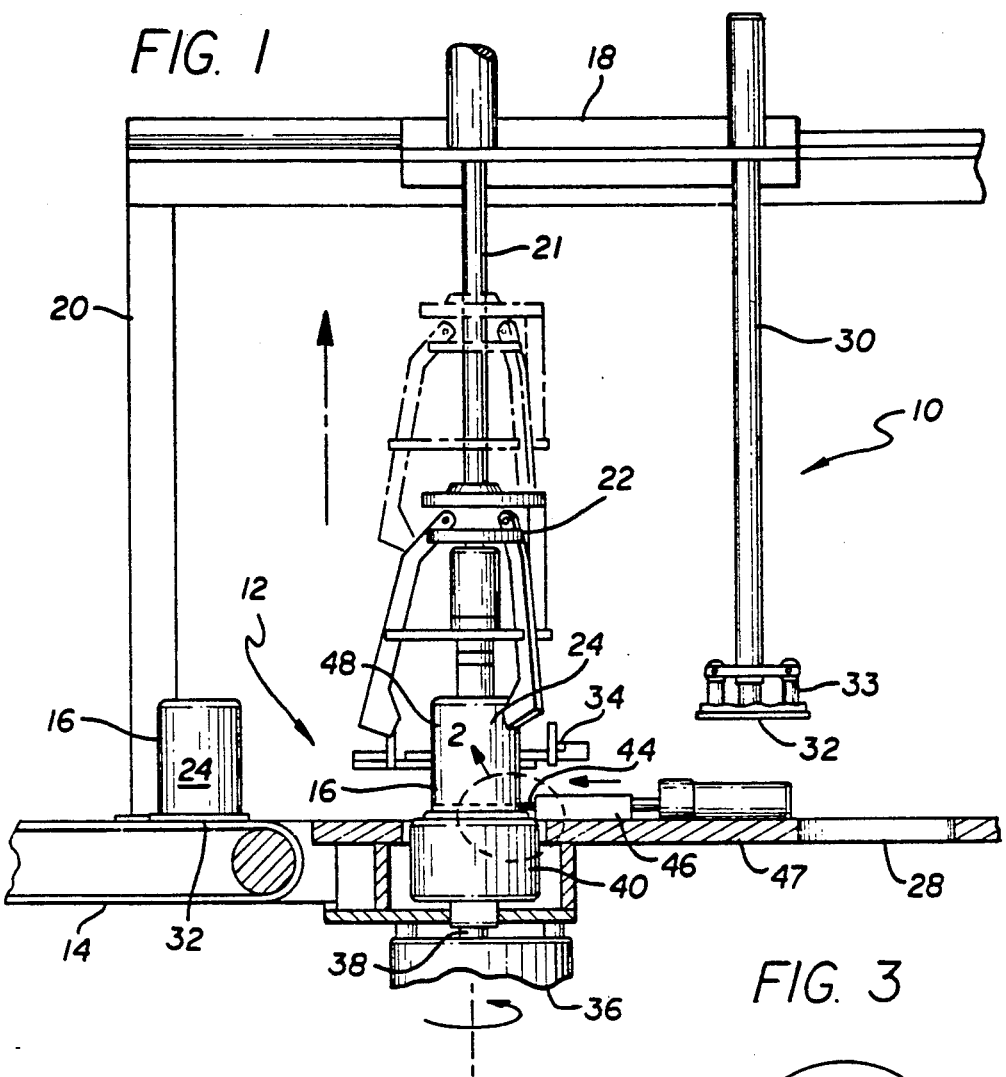

METHOD AND APPARATUS FOR CUTTING OIL-FILTER CANISTERS

REFERENCE TO RELATED APPLICATIONS

This application is a continuation in part of our application Ser. No. 07/967,763 filed Oct. 28, 1992, now U.S. Pat. No. 5,245,739, which in turn is a divisional application of application Ser. No. 07/851,011, filed Mar. 13, 1992, now U.S. Pat. No. 5,182,842 issued Feb. 2, 1993, and is also a continuation in part of our application Ser. No. 07/997,728, filed Dec. 30, 1992, now U.S. Pat. No. 5,297,332, which in turn is a continuation in part of application Ser. No. 07/851,011, filed Mar. 13, 1992, now U.S. Pat. No. 5,182,842 issued Feb. 2, 1993, each disclosure of which applications is incorporated herein by this reference.

TECHNICAL FIELD

This invention relates to apparatus for the recovery of useful components of oil filters, primarily automotive oil filters but including also stationary engine oil filters, and hydraulic machine oil filters, and filters for various organic fluids which circulate for reuse, such as cleaning fluids in dry cleaning establishments, all of which fluids are included herein under the term "oil", the filter being a device for the separation of contaminants from the oil by physical means involving capture of the contaminants on a surface, such as the surface of a filter element contained within a canister having means for inlet and outlet of oil.

More particularly, the invention is concerned with a highly automated apparatus for the step-wise disassembly of oil filters into their component parts for recovery and recycle, as a key part of a program to gather, breakdown and recycle the vast quantity of oil filters removed from service every day.

In a successful program of recovery and recycle of oil filter components the effective separation of the dissimilar components is critical. Metals such as the light metal canister and the heavy metal base are low in oil content and can be recycled into existing metals recovery programs.

The filter elements, however, are loaded with too much oil even after being let stand draining for days. The typically absorptive paper-like cellulosic or polymeric filter elements are designed to entrap contaminants, but oil as well is entrapped and it is difficult to separate the oil without squeezing the filter element.

Oil filter recovery systems which merely shred the oil filters, and then attempt to separate the filter material by metal recovery means, typically produce not only metal contaminated with too much residual oil, the result of entrainment of filter element material in the metal, but also frustrate efforts to squeeze the residual oil from the filter elements because the entrained metal shards are destructive of known squeezing apparatus.

BACKGROUND

In U.S. Pat. No. 5,182,842 an improved means of separating each of the several components of an oil filter was disclosed, involving cutting the canister, lifting off the cut canister, removing the filter element for processing separate from the canister and the metal base. In this manner, the metal components are substantially free of oil and ready for recycling into new metal products, while the filter elements are free of metal shards and can be efficiently processed to extract their oil (including heavy metal) content for separate disposal and leave a burnable residue high in fuel value, and so free of contaminant that combustion or landfill disposal is feasible.

SUMMARY OF THE INVENTION

The efficient separation of the canister from the filter element is dependent on rapid and sure clearance of the cut canister from the filter element. This is not simple on an automated basis, since the filters vary randomly in diameter, in clearance between filter element and canister wall, and in contour about their circumference. While these variables can be met by a cutting blade that is laterally shiftable, and has a knife edge that can be presented to a variety of differing oil filters, conventional knife edges have been found to be inadequate, tending as they do to turn the lightweight canister wall inward where it can contact the rough-surfaced filter element and, given its likely own rough edge, the canister wall and filter element may engage. The separation of the canister and filter element becomes problematical.

It is an object therefore of the present invention to provide an improved oil filter recycle and recovery system. It is another object to provide improvements in oil filter canister cutting means to minimize hanging-up of the canister on the filter element.

These and other objects to become apparent hereinafter are realized in accordance with the invention by localizing cutting deflection of the canister to avoid contact between the rough edges of the canister and the rough surfaced filter element.

Accordingly, the invention provides an apparatus for cutting apart an oil filter for ready separation of components, the oil filter comprising a canister having a generally cylindrical wall, a generally planar circular base fixed to the lower end of the canister wall and an oil filter element enclosed within the canister by the affixed base, the apparatus comprising a cutting blade arranged to intersect with the canister wall immediately adjacent the base, and means to relatively rotate the canister wall and cutting blade in intersected relation to sever the base from the canister, the cutting blade having a single bevel opposite the base to sever the canister wall without deflection of the canister wall into the filter element.

In the prior art, there has not been the recognition of the benefits to be gained by using a cutting blade beveled on but one side so that the deflection of the can wall into the can interior does not engage the filter element, perhaps because the prior art has not contemplated a highly automated system for oil filter deconstruction, wherein hang-ups are costly, but rather has limited itself to one-at-a-time processing of oil filters where the components are recovered as such, or has made no effort to recover the components as such as in shredding operations. In U.S. Pat. No. 3,900,948, for example, oil filters are cut apart, but the cutter blade is beveled on two sides, a condition that the present inventors have found leads to deflection of the canister wall above the cut into the opposing filter element, and hanging engagement of the canister on the element and troublesome separation. U.S. Pat. No. 0,539,971 uses a doubly beveled blade to cut into the top or side of a packing can in which no internal filter element is present and no problem with hanging up on fibrous contents is anticipated or provided for. In U.S. Pat. No. 3,608,192 there is a similar lack of recognition of the problem. In this last patent, the cutting wheel is doubly beveled as well. Apparently the author intends to process the oil filters upside down, such that the filter elements may be out of the way during cutting, but such inversion of the filters makes for complicated handling requirements and brings its own impracticalities to rapid processing of numerous oil filters, including necessary separation of the inwardly and downwardly disposed, messy and relatively flexible and difficult to grasp filter element from the canister, rather than separation of the overlying canister, with its relatively stiff and predictable walls, from the filter element.

In preferred modes of the invention, the filter element rests upon the base above the bottom edge margin of the canister wall and defines a clearance with the canister wall, the cutting blade bevel being arranged to deflect only the bottom edge margin of the canister wall and that below the filter element; there are further provided means to rotate the oil filter relative to the cutting blade, the cutting blade comprises a disc rotatable on its axis, the disc being beveled on its side opposite the base and non-beveled on its remote side against deflection by the cutting blade disc of severed canister wall into the filter element; there are further provided means mounting the cutting blade for retraction and advancement for selectively intersecting the canister wall, and means to rotate the oil filter relative to the cutting blade.

In further embodiments, the cutting blade comprises a disc rotatable on its axis, the disc being beveled on its side opposite the base and non-beveled on its remote side against deflection by the cutting blade disc of severed canister wall into the filter element.

In this and like embodiments, the disc is carried on a hub in radially projecting relation, the hub being configured to project the outer edge of the disc into intersection with the canister wall without the hub engaging the base.

The invention further includes the method of severing an oil filter canister wall from its base without hanging up the oil filter element from separation from the canister, including intersecting the canister wall with a relatively moving cutting blade having a single side bevel, the single side bevel being opposite the base, the canister wall being locally deflected only by the blade bevel and toward the base, whereby the filter element and canister are readily separated without tangling of the filter element with the canister wall.

BRIEF DESCRIPTION OF THE DRAWINGS

The invention will be further described as to an illustrative embodiment in conjunction with the attached drawings in which:

FIG. 1 is a side elevation view of the oil filter separation apparatus;
FIG. 2 is a view taken on line 2—2 in FIG. 1;
FIG. 3 is a top plan view of the cutting blade;
FIG. 4 is a view taken on line 4—4 in FIG. 3.

DETAILED DESCRIPTION

With reference now to the drawings in detail, in FIG. 1 an apparatus 10 for the rapid and successive cutting and separating of oil filter canisters from the base and filter element is shown to include a cutting station 12, and an endless belt arrangement 14 for bringing used oil filters 16 to the cutting station. An overhead traveler 18 supported by arm 20 has vertically movable rod 21 carrying clamp 22 adapted to engage and shift oil filter 16 from the belt 14 to the cutting station 12, and thence the canister 24 portion of the oil filter, after separation of the filter element 26 (FIG. 2), to recovery, e.g. through opening 28. A companion rod 30 terminating in magnetic pick-up 33 is carried by traveler 18 and serves to pick up and remove the oil filter 16 base 32 to a recycle point, not shown. Horizontally acting arm 34 serves to push the filter element 26 from the cutting station after upward removal of the canister 24 and before the upward removal of the oil filter base 32 by rod 30.

The oil filter 16 in cutting station 12 is rotated on its vertical axis by motor 36 driving shaft 38 which is coupled to a platform 40 having a plurality of spring loaded pins 42 (FIG. 2), certain of which will enter the ports 37 in the filter base 32, serving to positively drive the oil filter 16 to rotate about its axis.

Cutting of the canister 24 from the base 32 is by means of a cutting disc 44 (FIG. 3) splined on a free turning shaft (not shown) in the cutting head 46. The cutting head 46 is shiftable laterally on the table 47 to and from engagement of the cutting disc 44 with the wall 48 of the canister 24 of oil filter 16.

With reference to FIGS. 2 and 4, the configuration of the cutting disc 44 is such that there projects from the disc hub 50 a cutting edge 52 which has a beveled side 54 and an unbeveled or flat side 56. The engagement of the disc 44 with the canister wall 48 is in the lower edge margin 58 of the wall adjacent the crimped to the wall portion 60 of the base 32. The base 32 is typically inwardly deflected to provide an inward boss 62 into which mounting threads are tapped into opening 64 for connection of the filter 16 to an oil system. A plurality of ports 37 surround the opening 64 and are used for oil passage into or out of the filter 16.

The cellulosic, paper and or plastic polymer filter element 26 rests upon the boss 62 allowing a small clearance 70 beneath the filter element and above the crimped portion 60 of the filter base 32 for tangle free reception of the portion 66 of the wall 48 turned inwardly and downwardly by the cutting edge bevel 54 opposite the base 32, while the non-beveled side 56 being flat does not cause a turning of the wall 48 inward and upward, avoiding an incursion of the wall into the filter element 26. Other base configurations not defining a boss 62 will also permit cutting of the canister wall 48 without hang-up of the inwardly turned wall portion 66 into the filter element 26, by having the cutting disc 44 penetration be immediately adjacent the base 32 above its crimped portion 60 and at or below the lowermost extent 68 of the filter element 26.

The cutting disc 44 is placed against the filter canister wall 48 adjacently below the lowermost extent 68 of the filter element 26. The clearance 70 is typically not such as will permit use of a conventional cutting edge, one having two beveled sides, because the upper bevel will deflect the canister wall 48 inward and upward, likely engaging the opposing filter element. With a single side bevel 54, however, the disc 44 of the invention does not drive the canister wall 48 above the locus 72 of the cut in the wall inward to the extent that it will catch upon the filter element.

The canister 24 is thus readily lifted from the filter element 26 by the clamp 22 after the severing of the canister wall 48.

The foregoing objects are thus met.

We claim:
1. Apparatus for cutting apart an oil filter for ready separation of components, said oil filter comprising a canister having a generally cylindrical wall, a generally planar circular base fixed to an end of said canister wall and an oil filter element enclosed within said canister by said affixed base, said apparatus comprising a cutting blade arranged to intersect with said canister wall immediately adjacent said base, means to relatively rotate said canister wall and cutting blade in intersected relation to sever said base from said canister, said cutting blade having a single bevel adjacent said base to sever said canister wall without deflection of said canister wall into said filter element.

2. Apparatus according to claim 1, in which said filter element rests upon said base and defines an annular clearance with said canister wall at said base, said cutting blade bevel being arranged to deflect said canister wall only into said clearance.

3. Apparatus according to claim 1, further including means to rotate said oil filter relative to said cutting blade.

4. Apparatus according to claim 1, in which said cutting blade comprises a disc rotatable on its axis, said disc being beveled on its side adjacent said base and non-beveled on its opposite side to prevent deflection of severed canister wall into said filter element by said cutting blade disc.

5. Apparatus according to claim 1, further including means for mounting said cutting blade for retraction and advancement for selectively intersecting said canister wall.

6. Apparatus according to claim 5, further including means to rotate said oil filter relative to said cutting blade.

7. Apparatus according to claim 6, in which said cutting blade comprises a disc rotatable on its axis, said disc being beveled on its side adjacent said base and non-beveled on its opposite side to prevent deflection of severed canister wall into said filter element by said cutting blade disc.

8. Apparatus according to claim 7, in which said disc is carried on a hub in radially projecting relation thereto, said hub being configured to project the outer edge of said disc into intersection with said canister wall without said hub engaging said base.

9. Method of processing oil filters comprising a base, an oil filter element and a canister wall surrounding said filter element, including severing said oil filter canister wall from said base without hanging up the oil filter element thereon, including intersecting said canister wall with a relatively moving cutting blade having a single side bevel, said single side bevel being adjacent said base, said canister wall being locally deflected only by said blade bevel and toward said base, whereby said filter element and canister are readily separated without tangling of said filter element with said canister wall.

* * * * *